Dec. 2, 1947.　　　　R. D. BURCHFIELD　　　　2,431,915
BRIDGE UNBALANCE INDICATING MEANS

Filed Sept. 20, 1946

Inventor
Robert D. Burchfield
By Robert A. Lavender
Attorney

Patented Dec. 2, 1947

2,431,915

UNITED STATES PATENT OFFICE 2,431,915

BRIDGE UNBALANCE INDICATING MEANS

Robert D. Burchfield, Wilkinsburg, Pa., assignor, by mesne assignments, to the United States of America, as represented by the Atomic Energy Commission Application September 20, 1946, Serial No. 698,337

6 Claims. (Cl. 177—311)

This invention relates to electrical measuring and testing devices and more particularly to an electrical circuit for indicating a change in potential of a direct current input signal.

It is a principal object of this invention to provide an improved electrical bridge circuit having an audible frequency pulsating current output signal whose frequency is caused to vary and be indicative of changes in potential of a direct current input signal affecting an unbalanced condition of the bridge, the bridge circuit including a reflexed arrangement of a vacuum tube such that the vacuum tube performs dual functions as a controlled variable resistance direct current bridge leg and as an amplifier for the pulsating current output signal resulting upon the unbalanced condition of the bridge circuit.

The bridge circuit of this invention is of particular advantage when connected to the direct current output signal of a Piram vacuum gauge or an ionization vacuum gauge to provide for an audible indication of a change in pressure or vacuum conditions and hence provides for an effective means of audible leak detection when checking large vacuum systems for leaks.

Figure 1:
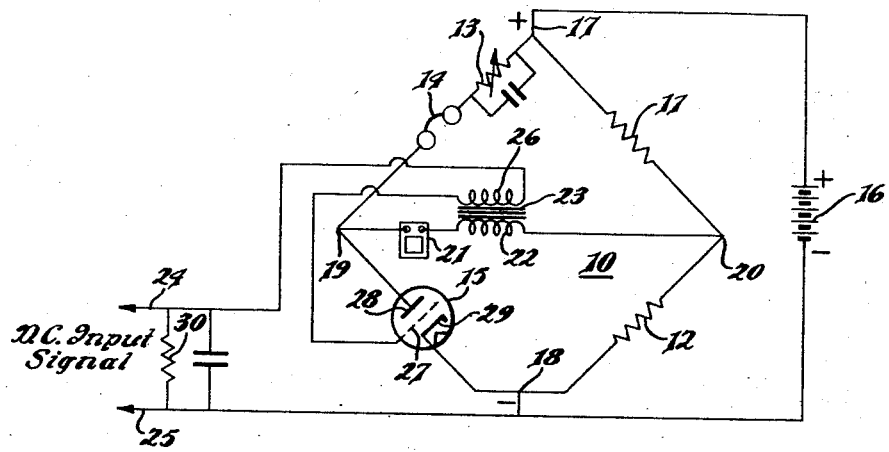
Figure 2:
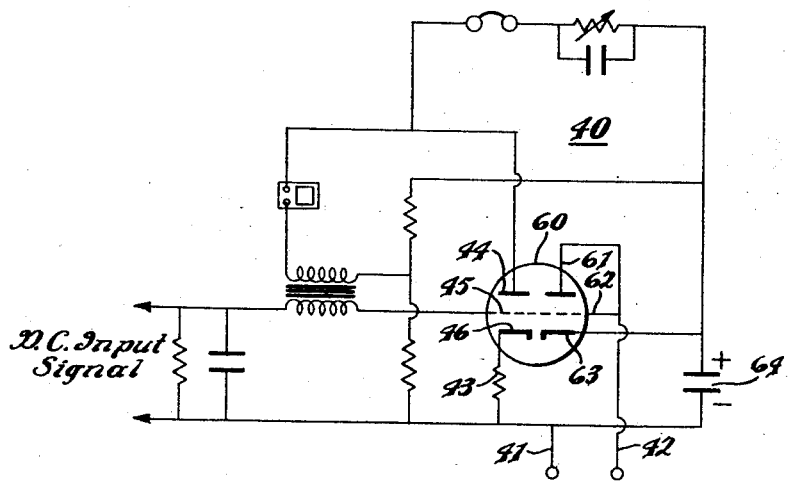

Further objects and advantages of this invention will be apparent upon referring to the following specification and drawing in which, Fig. 1 is a schematic wiring diagram of the basic electrical bridge circuit of this invention and, Fig. 2 is a schematic wiring diagram of a modified form of the electrical bridge circuit of Fig. 1 that is adapted to function from A. C. or D. C. live voltage power sources.

Referring to Fig. 1 of the drawings, the electrical bridge circuit 10 is comprised of the conjugate high resistance bridge legs 11, 12, the variable resistance 13 in series with the high impedance magnetic type earphones 14 and the triode vacuum tube 15. A battery 16 is connected across the bridge input terminals 17 and 18 and the unbalanced bridge current flows between the bridge output terminals 19 and 20 through the buzzer type current interrupter 21 and the primary 22 of transformer 23.

The direct current signal input whose changes in potential are to be audibly indicated by the bridge circuit of this invention is applied to the signal input terminals 24 and 25, terminal 25 being connected to the negative bridge terminal 18 of the bridge circuit while terminal 24 is connected through the secondary 26 of transformer 23 to the grid electrode 27 of tube 15. It will be noted that the plate 28 of tube 15 is connected through the earphones 14 and variable resistance 13 to the positive bridge terminal 17 while the cathode 29 is connected to the negative terminal 18. Resistance 30 is connected between the signal input terminals 24 and 25 to provide a grid return for the grid-cathode circuit of tube 15.

The operation of the invention as described in connection with Fig. 1 of the drawings is as follows: The bridge circuit 10 is first adjusted to a predetermined condition of balance by suitably adjusting the variable resistance 13. The predetermined condition of balance may be such as to cause no current flow between the bridge terminals 19 and 20 or it may be such as to cause a predetermined potential difference between terminals 19 and 20, as desired. In any event, a change in the condition of balance for the bridge circuit will change the potential difference between terminals 19 and 20 with respect to the potential difference for the predetermined condition of bridge balance. As is well known, the frequency of response for the interrupter 21 will be proportional to the potential difference of the applied direct current and hence the frequency will vary with a change in condition of balance for the bridge circuit. The direct current signal whose potential change is to be indicated by a change in balance of the bridge circuit 10 is applied through the input terminals 24 and 25 and the secondary 26 of transformer 23 to the grid of tube 15. Thus a change in D. C. input signal will change the potential on grid 27 of tube 15 thus changing that tube's internal resistance and the condition of balance for the bridge. This changed condition of balance causes a change in the frequency of the pulsating current passing through the primary winding 22 of transformer 23 between the bridge output terminals 19 and 20.

The pulsating current in the primary winding 22 induces a similar pulsating current in the transformed secondary winding 26 which is also applied to the grid 27 of triode 15 causing amplified pulsations of similar frequency to appear in the tube plate load comprised of headphones 14 together with the adjustable resistance 13 and to circulate in the bridge circuit. If the interrupter 21 is of the audible frequency buzzer type, the pulsations will be of an audible frequency and therefore an audible indication of change in frequency due to change in the D. C. signal input to terminals 24 and 25 will be heard in the earphones 14. It is to be noted that in the circuit of this invention, the triode 15 is used in a reflex manner to function as a variable resistance direct current leg of the bridge circuit 10 and as an amplifier for the pulsating bridge output current in the primary 22 of transformer 23.

The circuit of Fig. 2 is similar to that of Fig. 1 except that a dual purpose tube 60 which may be a dual triode is used. One section of the dual purpose tube 60 is connected as a rectifier to provide the direct current power input to the bridge circuit 40 in place of the battery 16 as shown in Fig. 1. Terminals 41 and 42 are provided for connection to a 110 volt A. C. or D. C. line voltage source. Plate 61 and grid 62 are connected together and to terminal 42 while the cathode 63 is connected through a filter condenser 64 to terminal 41 thus providing a half wave rectifier circuit. The rectifier output appearing between the cathode 63 and terminal 41 is applied to the bridge circuit 40 in the same manner as the battery 16 is connected to the bridge circuti 10 of Fig. 1. The bridge circuit of Fig. 2 is in all other respects identical with the bridge circuit of Fig. 1 except for the provision of a cathode bias resistance 43 to obtain proper bias conditions for the triode section comprised of plate 44, grid 45 and cathode 46.

The operation of the electrical bridge circuit 40 is identical with that described for bridge circuit 10 shown in Fig. 1 except that terminals 41 and 42 are properly polarized and connected to an A. C. or D. C. source of line voltage in place of the battery 16.

It will perhaps be noted that a description of the filament connections for tubes 15 and 60 has been omitted but since such connections are well known it is thought unnecessary to refer to them in detail. It should also be understood that the tube types or circuit values which may be used in the bridge circuit of this invention are not critical to its proper functioning within the purview of the invention.

I claim:

1. Electrical circuit means for providing a pulsating current frequency change indicative of a change in potential of a direct current signal, said circuit comprising a direct current resistance bridge, a resistance leg of said bridge being comprised of a vacuum tube having a control grid, cathode and plate; another leg of said bridge including means to indicate the frequency of any pulsating current circulating in said bridge, a direct current power source connected to the input terminals of said bridge, an interrupter connected in series with a primary winding of a transformer across the output terminals of said bridge, and a secondary winding of said transformer connected in series with the direct current input signal to be indicated and the grid-cathode circuit of said vacuum tube.

2. Electrical circuit means for providing a pulsating current frequency change indicative of a change in potential of a direct current signal, said circuit comprising a direct current resistance bridge, a resistance leg of said bridge being comprised of a vacuum tube having a control grid, cathode and plate; another leg of said bridge including means to indicate the frequency of any pulsating current circulating in said bridge, a direct current power source connected to the input terminals of said bridge, adjustable means to balance said bridge, an interrupter connected in series with a primary winding of a transformer across the output terminals of said bridge, and a secondary winding of said transformer connected in series with the direct current input signal to be indicated and the grid-cathode circuit of said vacuum tube.

3. Electrical circuit means for providing an audible pulsating current frequency change indicative of a change in potential of a direct current signal, said circuit comprising a direct current resistance bridge, a resistance leg of said bridge being comprised of a vacuum tube having a control grid, cathode and plate; another leg of said bridge including magnetic earphones to indicate the audible frequency of any pulsating current circulating in said bridge, a direct current power source connected to the input terminals of said bridge, an interrupter connected in series with a primary winding of a transformer across the output terminals of said bridge, and a secondary winding of said transformer connected in series with the direct current input signal to be indicated and the grid-cathode circuit of said vacuum tube.

4. Electrical circuit means for providing an audible pulsating current frequency change indicative of a change in potential of a direct current signal, said circuit comprising a direct current resistance bridge, a resistance leg of said bridge being comprised of a vacuum tube having a control grid, cathode and plate; the conjugate bridge leg connected to the plate of said vacuum tube including a pair of magnetic earphones to indicate the audible frequency of any pulsating current circulating in said bridge, a direct current power source connected to the input terminals of said bridge, an interrupter connected in series with a primary winding of a transformer across the output terminals of said bridge, and a secondary winding of said transformer connected in series with the direct current input signal to be indicated and the grid-cathode circuit of said vacuum tube.

5. Electrical circuit means for providing an audible pulsating current frequency change indicative of a change in potential of a direct current signal, said circuit comprising a direct current resistance bridge, a resistance leg of said bridge being comprised of a vacuum tube having a control grid, cathode and plate; another leg of said bridge including magnetic earphones to indicate the audible frequency of a pulsating current circulating in said bridge, a direct current power source connected to the input terminals of said bridge, adjustable means to balance said bridge, an interrupter connected in series with a primary winding of a transformer across the output terminals of said bridge, and a secondary winding of said transformer connected in series with the direct current input signal to be indicated and the grid-cathode circuit of said vacuum tube.

6. Electrical circuit means for providing an audible pulsating current frequency change indicative of a change in potential of a direct current signal, said circuit comprising a direct current resistance bridge, a resistance leg of said bridge being comprised of a vacuum tube having a control grid, cathode and plate; the conjugate bridge leg connected to the plate of said vacuum tube including a pair of magnetic earphones to indicate the audible frequency of any pulsating current circulating in said bridge, a direct current power source connected to the input terminals of said bridge, adjustable means to balance said bridge, an interrupter connected in series with a primary winding of a transformer across the output terminals of said bridge, and a secondary winding of said transformer connected in series with the direct current input signal to be indicated and the grid-cathode circuit of said vacuum tube.

ROBERT D. BURCHFIELD.